July 1, 1958
C. VAN DEVENTER IV
2,841,020
SHEAVE ASSEMBLIES FOR LOOMS
Filed Jan. 5, 1954
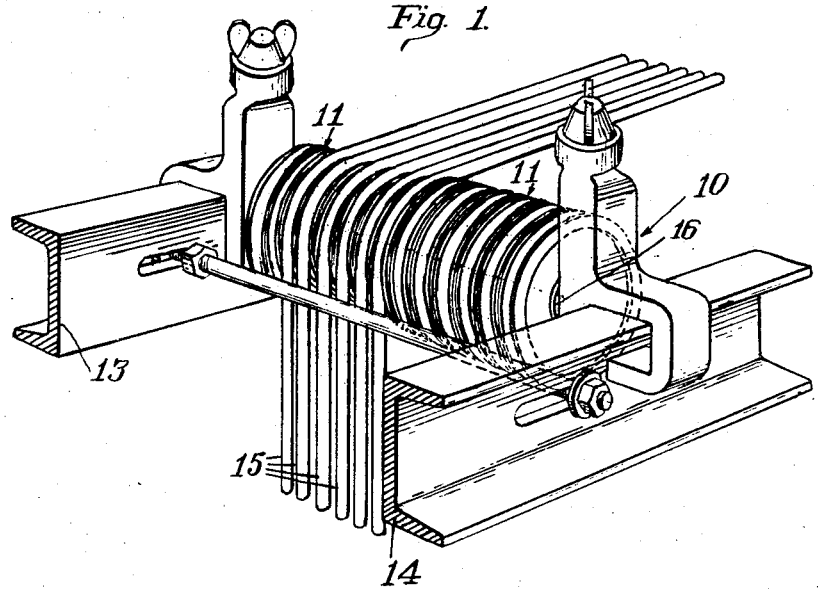
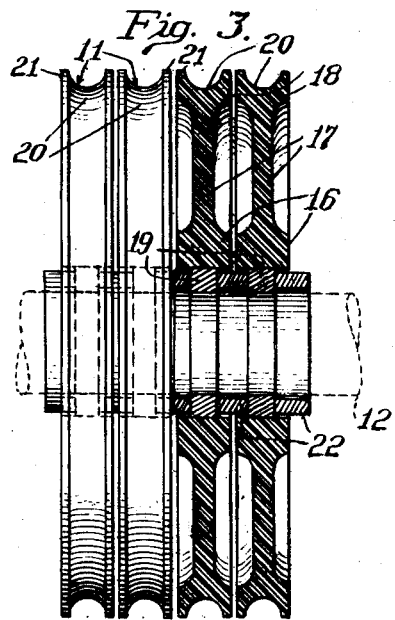
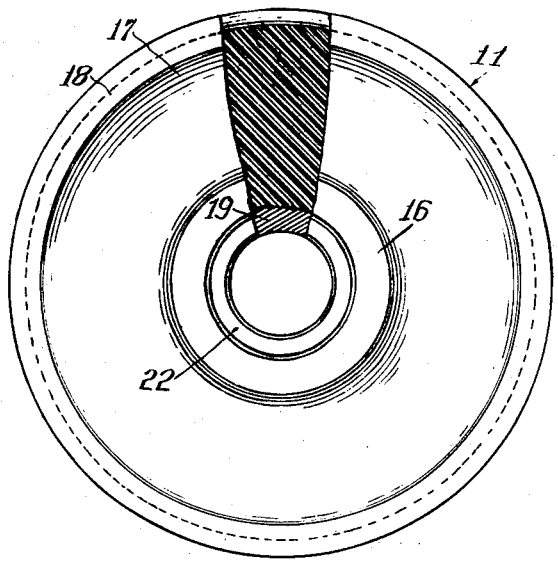
INVENTOR
Christopher VanDeventer, IV
BY
ATTORNEYS

United States Patent Office 2,841,020
Patented July 1, 1958

2,841,020

SHEAVE ASSEMBLIES FOR LOOMS

Christopher Van Deventer IV, Knoxville, Tenn.

Application January 5, 1954, Serial No. 402,270

2 Claims. (Cl. 74—230.01)

This invention relates to improvements in sheave assemblies for looms.

A loom usually has a series of harness frames suspended by ropes or cords, particularly in the case of dobby looms, which ropes or cords pass over sheaves. In manipulating the harness frames the ropes or cords move endwise, which causes a considerable rocking motion of the sheaves or pulleys on which they are mounted, in a forward and backward motion.

The sheaves are mounted on a common shaft in side-by-side relation, providing a sheave assembly, and while all of them are journaled on the shaft, they may move relative to each other in the manipulation of the harness frames. Frequently, the sheaves are made of plastic material, although formerly they were of metal or wood.

Heretofore it has been customary, with most sheaves for this purpose, to provide flanges on only one side thereof. It is recognized that the forward and backward motion of the sheaves in moving the harness frames causes a radial action thereon which results in an uneven wear on the bushings, causing them to be worn into an oval shape. This results in a sidewise tipping of the the respective sheaves out of line with each other and thereby increases the wear on the sheaves as well as causing an undue wear on the cords or ropes on which the harness frames are supported, which often makes it necessary to change the sheave assembly and replace the sheaves after each run of cloth.

One object of this invention is to overcome these objections to sheave assemblies used heretofore and to improve the construction thereof.

Another object of the invention is to provide for the effective maintenance of the spaced relation of the sheaves to prevent them from rubbing against each other and by using dissimilar materials to reduce substantially the generation of heat between the bearing members or surfaces as a result of relative rotation of the sheaves.

These objects may be accomplished by forming individual sheaves of plastic material provided, respectively, with bushings for mounting the same on a cross shaft. The sheaves are mounted in side-by-side relation in an assembly. Each of the sheaves is provided with a bushing in the hub thereof, which bushing nevertheless does not project out of the hub, but is shorter in length than the axial width of the hub so as to avoid the possibility that the bushings of adjacent sheaves will rub directly together. Moreover, in order to prevent the rubbing of the plastic hubs of the sheaves together, these are held in spaced relation by thrust washers or rings interposed between the bushings of adjacent sheaves and preferably formed of unlike metal to the sheave bushings.

It is known that the rubbing together of like metals, such as bronze bushings in sheaves mounted in side-by-side relation on the shaft, will create heat therebetween which will destroy the mounting and the uniform operation of the sheaves. This is prevented by interposing between the bushings thrust rings preferably formed of different materials from the bushings. As an example, the bushings may be formed of porous bronze impregnated with a lubricant, and ferrous metal thrust rings are interposed between the bushings to hold the latter properly spaced apart and to prevent the bronze bushings of adjacent sheaves from rubbing directly against each other, which thus would cause heat. Inasmuch as these rub against the ferrous metal thrust rings formed of dissimilar material, substantially no heat is generated in the operation of the sheaves.

This embodiment of the invention is illustrated in the accompanying drawings in which:

Fig. 1 is a perspective view of a portion of the loom showing a sheave assembly;

Fig. 2 is a side elevation of one of the sheaves detached; and

Fig. 3 is a view at right angles thereto showing a plurality of said sheaves, with parts thereof in section.

Referring now in detail to the drawings, the present invention is shown in its preferred form as embodied in a loom sheave assembly 10 wherein a plurality of sheaves 11 are rotatably journaled upon a common shaft 12 which is mounted between two frame members 13 and 14 of the loom. The sheaves are adapted to guide the flexible cords shown at 15. The sheaves 11 have an oscillating forward and backward motion in the operation of the loom and the harness frames are attached to the cords.

Each of the sheaves 11 preferably is formed of molded plastic material, as described more fully in Patent No. 2,315,301, dated March 30, 1943. Each sheave has a hub portion 16 connected by a web 17 with a rim 18, all molded in one piece. The web 17 preferably has flat or smooth opposite faces, and does not require the spoke portions shown in the prior patent. The hub 16 is mounted on a bushing 19 fixed thereto, as described more fully in the prior patent.

The rim 18 of each pulley is formed with a peripheral groove 20, having flanges 21 on opposite sides thereof, of uniform and equal height relative to the groove. The groove 20 is adapted to receive one of the cords 15, and the flanges 21 preferably are of a height equal to at least half the diameter of the cord so as to receive a substantial portion of the thickness of the cord in the groove and thereby protect the cord.

The bushing 19 of each sheave is appreciably shorter in axial length than the axial dimension of the hub 16 so as to be confined at opposite ends against projection out of the hub. This bushing 19 is molded in the plastic hub during the molding of the latter. Inasmuch as the bushing does not project out of the hub, as in the prior Patent No. 2,315,301, there is no danger that like materials of the bushings of adjacent sheaves would be rubbing directly together.

At the same time it is desirable to prevent a rubbing of the molded faces of the sheaves and of the hubs thereof against each other because that would tend to destroy the plastic body and would cause a sifting of dust from the plastic body onto the material being woven in the loom. This is prevented by interposing between the bushings 19 of adjacent sheaves thrust rings 22, each having an outside diameter sufficiently small relative to the inside diameter of the hub 16 to enter the latter so as not to bear axially against the face of the adjacent hub nor to rub against the plastic thereof. At the same time, the axially extending end of the thrust ring 22 will bear axially against the adjacent end of the bushing 19 of each adjacent sheave at opposite ends of the thrust ring. The length of the thrust ring should be sufficiently great to hold the adjacent sheaves spaced apart both at the hubs thereof and at their peripheral flanges to prevent an abrading action by the wearing contact of the plastic bodies of the sheaves with respect to each other. Rings 22 are loosely mounted on shaft 12.

It is preferred that the bushing 19, which is fixed to the body of the hub 16, be impregnated with lubricant. A porous bronze material in which lubricant has been incorporated may be sufficient for this purpose to lubricate the rotation of the sheave on the shaft 12. At the same time, there will be no danger of dripping of lubricant onto the woven fabric. The thrust ring 22 between each adjacent pair of sheaves should be formed of a dissimilar material from the material of the bushing 19 to prevent the generation of heat therebetween as a result of relative rotation. Where the bushing 19 is formed of porous bronze material, a suitable material for the thrust ring 22 would be ferrous metal.

The interposed thrust ring 22 between each adjacent pair of sheaves serves to hold the bushings 19 properly spaced apart and allows use of bushings that are shorter in axial extent than the axial width of the hubs of the sheaves to prevent the bushings from rubbing directly together in end-to-end relation, such as to generate heat between like metals of which the bushings would be formed. Moreover, the interposed thrust rings prevent accidental wearing away of the plastic bodies of the sheaves due to contact one with another, and by entering the hubs of adjacent sheaves the thrust rings maintain the proper spaced relation therebetween.

This construction provides for a cooler operating temperature for the sheaves, even when turned at high speed, and with a longer life expectancy. The cooling effect thereby provided will assure adequate lubrication, and thus preserve the smooth operation of the sheaves over a greater period of time than would be possible otherwise, even without the use of excessive lubricant.

The thrust rings need not be lubricated when formed of ferrous metal used in connection with porous bronze bushings. However, these metals may be reversed or other materials used for the bushings, which should be self-lubricating, in which event bronze or other material dissimilar from the material of the bushings may be used to form the thrust rings.

Such a construction provides for the proper spacing of the sheaves from each other and avoids face friction between the sheaves, thereby avoiding dusting on the fabric that would result if the sheaves rubbed directly together. At the same time, the construction prevents the rubbing together of like materials used in the bushings and thereby maintains cool operation and long life of the sheaves.

While the invention has been illustrated and described in one embodiment, it is recognized that variations and changes may be made therein without departing from the invention as set forth in the claims.

I claim:

1. In a loom sheave assembly comprising a supporting shaft and a plurality of sheaves, each of the sheaves including a body having a hub thereon formed in one integral piece of molded plastic material and a bushing mounted in the hub and fixed thereto, the bushing being shorter in length than the hub with the hub projecting at opposite ends beyond the ends of the bushing, and a thrust ring mounted on the shaft between adjacent sheaves and having opposite ends projecting into the hubs of adjacent sheaves into axially abutting relation with the bushings thereof, said thrust ring and bushings being formed of dissimilar metals, said thrust ring having an external diameter smaller than the internal diameter of the hub and spaced therefrom substantially throughout the periphery of the thrust ring, said thrust ring having a length sufficient to maintain the bodies of adjacent sheaves spaced apart.

2. In a loom sheave assembly comprising a supporting shaft and a plurality of sheaves, each of the sheaves including a body having a hub thereon formed in one integral piece of molded plastic material and a bushing mounted in the hub and fixed thereto, the bushing being shorter in length than the hub with the hub projecting at opposite ends beyond the ends of the bushing, and a thrust ring mounted on the shaft between adjacent sheaves and having opposite ends projecting into the hubs of adjacent sheaves into axially abutting relation with the bushings thereof, said thrust ring and bushings being formed one of steel and the other of non-ferrous metal, said thrust ring having an external diameter smaller than the internal diameter of the hub and spaced therefrom substantially throughout the periphery of the thrust ring, said thrust ring having a length sufficient to maintain the bodies of adjacent sheaves spaced apart.

References Cited in the file of this patent

UNITED STATES PATENTS

| 26,387 | Vandeventer | Dec. 6, 1859 |
| 419,556 | Reeves | Jan. 14, 1890 |
| 1,796,673 | Truxell | Mar. 17, 1931 |
| 1,930,626 | Schwemlein | Oct. 17, 1933 |
| 2,274,099 | Smith et al. | Feb. 24, 1942 |
| 2,315,301 | Van Deventer | Mar. 30, 1943 |
| 2,379,742 | Payne | July 3, 1945 |
| 2,760,378 | Van Deventer III | Aug. 28, 1956 |

FOREIGN PATENTS

| 1,030,272 | France | Mar. 11, 1953 |